United States Patent [19]

Guerrico Echevarría

[11] 4,044,809
[45] Aug. 30, 1977

[54] TIGHTENING AND SEALING DEVICE

[75] Inventor: Nicolás Guerrico Echevarría, Legazpia (Guipuzcoa), Spain

[73] Assignee: Plasticos Mel S.A., Legazpia (Guipuzcoa), Spain

[21] Appl. No.: 658,012

[22] Filed: Feb. 13, 1976

[51] Int. Cl.² ............... F16B 39/284; F16B 39/36
[52] U.S. Cl. ........................... 151/19 R; 151/7
[58] Field of Search ............ 151/7, 19 R, 38; 85/33, 85/1 JP, 32 V, 36

[56] References Cited

U.S. PATENT DOCUMENTS

| 2,392,704 | 1/1946 | Simmons | 151/7 |
| 2,930,424 | 3/1960 | Van Buren | 151/7 |
| 3,508,593 | 4/1970 | Gill | 151/7 X |

FOREIGN PATENT DOCUMENTS

| 1,027,178 | 2/1953 | France | 151/19 R |
| 18,418 | 8/1911 | United Kingdom | 151/19 R |
| 129,088 | 6/1919 | United Kingdom | 151/19 R |

Primary Examiner—Ramon S. Britts
Attorney, Agent, or Firm—Wenderoth, Lind & Ponack

[57] ABSTRACT

A tightening and sealing device is made from plastic material and includes two members which can be coupled to each other. The member acting as the tightening element includes an internally threaded hollow cylinder divided into three cylindrical segments by longitudinal and axial slots spaced from each other by 120°. Each segment has extending outwardly from an end thereof and centered between adjacent slots a flexible leg. The legs are joined to the end of an outer body which is concentric with the cylinder and which is internally cylindrical and externally polygonal. The second member which acts as the sealing element is composed of a cap-shaped element having an axial bore and an annular flange dimensioned to fit into a space between the concentric bodies forming the tightening element.

3 Claims, 5 Drawing Figures

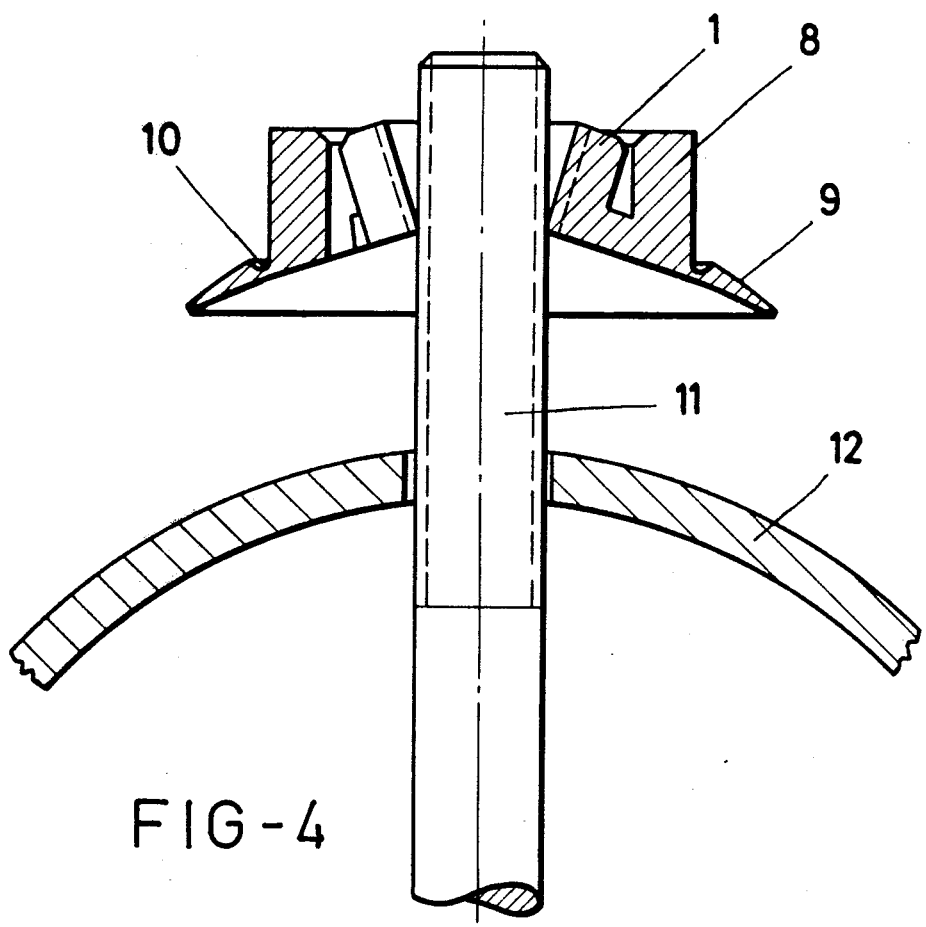

TIGHTENING AND SEALING DEVICE

BACKGROUND OF THE INVENTION

This invention relates to a tightening and sealing device which is especially applicable in the fastening of corrugated type roofing elements which, as is known, are attached to a series of bolts which are fixed to the beams on which the corrugated roofing is situated. The stems of the bolts extend through orifices made in the roofing elements. In present fastening devices, a washer fits on the stem, and a nut made from a material and having a hardness different from the washer, is threaded onto the stem and compresses the washer against the roofing element. Deformation of the washer having a hardness less than the nut occurs when the nut is screwed and tightened, thus sealing the orifice through which the stem of the bolt passes. Thus, on the one hand, fastening of the roofing element is achieved, and, on the other hand, atmospheric agents, such as water or wind, are prevented from passing through the orifice which is sealed due to the deformation of the washer.

In this presently employed device, it is necessary to screw the nut along the entire length of the threaded stud.

SUMMARY OF THE INVENTION

In order to avoid the loss in time involved in screwing the nut along the entire length of the stem, the present invention replaces the nut and washer, made from two materials of different hardness, with a pair of members, both of which are formed from a rigid plastic material, preferably nylon or the like, which can be conveniently coupled to each other, so that the member acting as a nut is, at the same time, the sealing member. The fastening member can slide without being screwed along the stud until it contacts the roofing element itself, at which position a cap-shaped sealing member is inserted into the tightening member to force the tightening member to be adapted to the threads of the stud. The tightening member is then tightened with a tool such as a spanner to turn the assembly about the stud and thus achieving tightening of the roofing element with respect to the bolt. At the same time deformation of a skirt of the nut provides sealing around the nut. The cap or sealing member has an orifice through which the stud extends, the orifice having a smaller radius than the stud. The edge of the orifice forms a lip which is adapted to the screw threads, thus forming a seal preventing passage therethrough of, for example, water.

BRIEF DESCRIPTION OF THE DRAWINGS

The structure of the tightening and sealing device of the present invention is described in more detail below with reference to the attached drawings, wherein:

FIG. 3 is an elevational view, with one quadrant thereof in section, of the other member of the invention which is complementary to that illustrated in FIGS. 1 and 2;

FIG. 4 is a section illustrating the device of FIGS. 1 and 2 being assembled onto a threaded rod employed to assemble corrugated roofing elements.

DETAILED DESCRIPTION OF THE INVENTION

Figure 1:
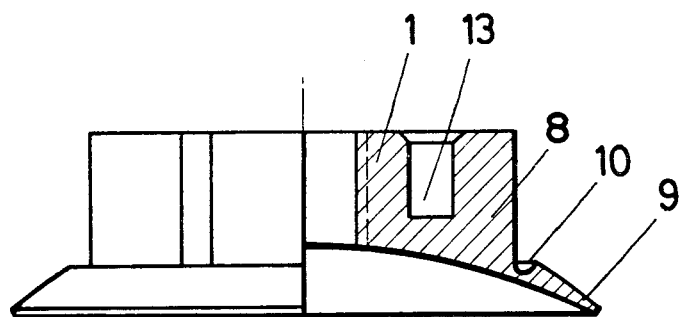
FIG. 1 is an elevational view, with one quadrant thereof in section, of one of the members of the device of the invention.
Figure 2:
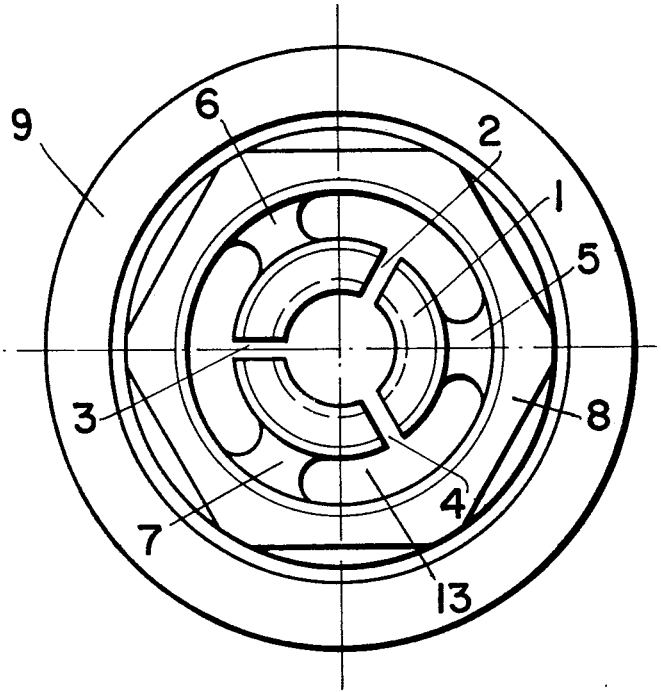
FIG. 2 is a plan view of the device of FIG. 1.

The tightening member of the invention, illustrated in FIGS. 1 and 2, is an integral member formed of a rigid plastic material and includes a cylindrical central body 1 which is internally threaded and which is divided into cylindrical segments by longitudinal and radial slots or cuts 2, 3 and 4, equally circumferentially spaced. Each cylindrical segment has at the bottom outer edge thereof a radially outwardly extending bridge or leg 5, 6 or 7. The legs are circumferentially spaced from each other and are joined to the lower inner edge of a body 8 which is concentric with body 1. Body 8 has a nut-like configuration, that is a circular interior and a polygonal, such as hexagonal, exterior.

Thus, an annular channel 13 is formed between body 1 and body 8.

Projecting radially outwardly and sligthly downwardly from body 8 is a type of skirt 9 which is annular and which is joined to the lower edge of body 8 by a weakened, thin annular zone 10.

The lower part or surface of the tightening member illustrated in FIGS. 1 and 2 is concave and has a radius approximately equal to that of the surface of the corrugated roofing element 12 to which the tightening device is applied. The body 1, the body 8, the legs 5, 6 and 7 and the skirt 9 are all integrally formed as a single element forming the tightening member.

Referring to FIG. 4, and assuming that the threaded stem 11 of a member for fastening roofing elements 12 extends through an orifice previously made through the element 12, the tightening member illustrated in FIGS. 1 and 2 will then slide along the threaded stem 11. This is possible due to the radial outward pivoting of the cylindrical segments of the central body 1 of the tightening member. Thus, the tightening member can then slide downwardly until the bottom surface thereof contacts the convex upper surface of the roofing element 12.

The sealing member, which is complementary to the tightening member, is illustrated in FIG. 3, and is in the form of a cap-shaped element 14 which is a spherical segment having a convex upper surface and a concave lower surface which has extending downwardly therefrom an annular cylindrical flange 15 which has a thickness and height to be complementary to and fit within channel 13 of the tightening member. It can be seen from FIG. 5, the flange 15 completely fills the annular channel 13, and consequently, when the sealing member is put in place, the internal threads of the segments of body 1 are pressed radially inwardly against and into meshing engagement with threads of the stem 11. Then by using, for example, a nut spanner against the nut-shaped exterior of body 8, the assembly of the two members is made to turn. Thus, the skirt 9 is pressed onto the roofing element 12 which will give way slightly due to the annular weakened line 10 which joins skirt 9 to the body 8.

Figure 5:
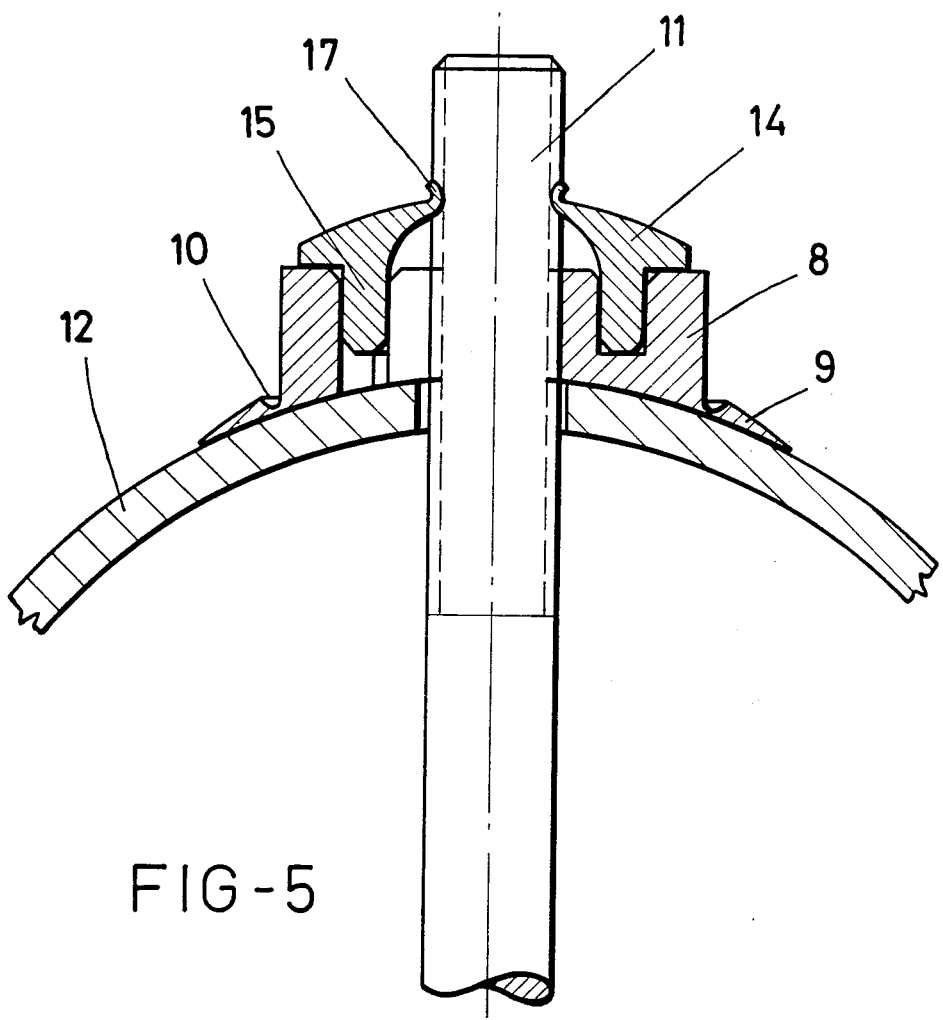
FIG. 5 is a view similar to FIG. 4, but with the members of FIGS. 1 and 3 in the fully assembled position.

Meanwhile, the sliding movement of member 14 over the stem 11 will cause the annular lip 17, which defines an orifice 16 through member 14 having a smaller diameter than that of stem 11, to be deformed and to be pressed into and fill the hollows formed by the threads of the stem 11, as illustrated in FIG. 5. Thereby, a seal is formed which prevents the possible penetration of rain water, which could otherwise occur if the annular lip 17 did not deform and adapt to the hollows of the threads of stem 11.

It will be apparent that the securing of corrugated roofing elements by means of the device of the present invention may be carried out much more rapidly than by screwing a nut preceded by a washer along the entire length of the projecting part of stem 11, as is necessary in prior art systems.

I claim:

1. A tightening and sealing device, particularly for sealingly attaching a corrugated roofing element to a threaded stem extending through an orifice in the roofing element, said device comprising:

a tightening member including a central, cylindrical internally threaded body divided into a plurality of separate cylindrical segments by a plurality of radial and longitudinal slots, each of said cylindrical segments having extending outwardly from a first axial end thereof a leg, the legs of said segments being circumferentially spaced from each other, an outer body coaxially surrounding said central body, said outer body being joined at a first axial end thereof to said legs, said outer body having a cylindrical inner surface and a polygonal outer surface, said central and outer bodies defining therebetween an annular cylindrical channel open at second ends of said cylindrical segments and said outer body, said outer body having extending outwardly from said first end thereof a flexible annular skirt, said cylindrical segments, said legs, said outer body and said skirt being formed as an integral single member of a rigid plastic material;

said tightening member being axially slidable without rotation over a threaded stem until said skirt contacts a roofing element supported by the stem, said cylindrical segments being outwardly bendable at said legs during such sliding; and a sealing member including a cap-shaped element having extending therethrough an orifice to receive the threaded stem and having extending therefrom a cylindrical flange dimensioned to fit within and fill said annular channel, said flange when fitting within said channel forcing said cylindrical segments inwardly such that the internal threads thereof mesh with the threads of the stem, such that a wrench engaging said outer surface of said outer body can rotate said tightening member about the stem and into tight and sealing contact with the roofing element.

2. A device as claimed in claim 1, wherein the surface of said skirt to contact the roofing element is dimensioned to the configuration of the roofing element, and said skirt is joined to said outer body by an annular reduced thickness zone.

3. A device as claimed in claim 1, wherein said orifice through said cap-shaped element has a diameter less than that of the stem, said orifice being defined by a flexible annular lip which deforms into and fills the threads of the stem when the stem extends through said orifice.

* * * * *